(12) United States Patent
Kellner (10) Patent No.: US 9,388,547 B2
(45) Date of Patent: Jul. 12, 2016

(54) DEVICE FOR ANCHORING CONSTRUCTIONS IN THE GROUND (71) Applicant: Peter Kellner, Philippsthal (DE)

(72) Inventor: Peter Kellner, Philippsthal (DE)

( * ) Notice: Subject to any disclaimer, the term of this patent is extended or adjusted under 35 U.S.C. 154(b) by 0 days.

(21) Appl. No.: 14/415,691

(22) PCT Filed: Jun. 7, 2013

(86) PCT No.: PCT/EP2013/061846
§ 371 (c)(1),
(2) Date: Jan. 19, 2015

(87) PCT Pub. No.: WO2014/012708
PCT Pub. Date: Jan. 23, 2014

(65) Prior Publication Data
US 2015/0159337 A1 Jun. 11, 2015

(30) Foreign Application Priority Data
Jul. 19, 2012 (DE) .................. 10 2012 212 700

(51) Int. Cl.
E04H 12/22 (2006.01)
H01Q 1/12 (2006.01)
(Continued)

(52) U.S. Cl.
CPC ...... *E02D 5/80* (2013.01); *E02D 27/42* (2013.01); *E04H 12/2215* (2013.01);
(Continued)

(58) Field of Classification Search
CPC ......... E04H 12/08; E04H 12/20; E04H 12/22; E04H 2012/006; E02D 27/42; H01Q 1/12; H01Q 1/1235; F16M 11/22

USPC ........ 248/163.1, 170, 188.7, 188.1, 519, 529, 248/346.3; 343/878, 880, 881, 882, 888, 343/890
See application file for complete search history.

(56) References Cited

U.S. PATENT DOCUMENTS

| 390,186 | A | * | 9/1888 | Newcomb | ............... | E04H 12/20 |
| | | | | | | 52/148 |
| 1,334,053 | A | * | 3/1920 | Reynolds | ............... | E04H 12/22 |
| | | | | | | 52/152 |

(Continued)

FOREIGN PATENT DOCUMENTS

| CN | 200955275 | 10/2007 |
| CN | 201785766 | 4/2011 |

(Continued)

OTHER PUBLICATIONS

International Search Report for PCT/EP2013/061846, English translation attached to original, Both completed by the European Patent Office on Jul. 29, 2013, All together 6 Pages.
(Continued)

*Primary Examiner* — Ryan Kwiecinski
(74) *Attorney, Agent, or Firm* — Brooks Kushman P.C.

(57) ABSTRACT

A device for anchoring constructions in the ground, having a tubular support column or support element and having supporting plates arranged in a supporting plane, wherein the tubular support column is in the form of a continuous part which extends from the supporting plane to above the ground, the tubular support column, the supporting plates and the connecting webs consist of steel, the tubular support column or the support element, the supporting plates and the connecting webs are connected together by screw connections, and the supporting plates are connected to the tubular support column by connecting webs.

15 Claims, 7 Drawing Sheets (51) Int. Cl.
    *E02D 27/42*         (2006.01)
    *F16M 11/22*         (2006.01)
    *E02D 5/80*          (2006.01)
    *F03D 11/04*         (2006.01)
    *E04H 17/22*         (2006.01)
    *F24J 2/52*          (2006.01)
    *E04H 12/00*         (2006.01)

(52) U.S. Cl.
    CPC ....... *E04H 12/2238* (2013.01); *E04H 12/2269* (2013.01); *E04H 12/2284* (2013.01); *E04H 17/22* (2013.01); *F03D 11/045* (2013.01); *F16M 11/22* (2013.01); *F24J 2/525* (2013.01); *H01Q 1/12* (2013.01); *H01Q 1/1235* (2013.01); *E04H 2012/006* (2013.01); *Y02E 10/47* (2013.01); *Y02E 10/728* (2013.01)

(56) References Cited

U.S. PATENT DOCUMENTS

| | | | | |
|---|---|---|---|---|
| 2,410,227 A * | 10/1946 | Matthews | ............... | A47G 33/12 248/524 |
| 2,474,250 A * | 6/1949 | Howard | ............... | F16M 11/00 184/15.1 |
| 2,645,441 A * | 7/1953 | Meredith | ............... | A47G 33/12 248/524 |
| 2,987,282 A * | 6/1961 | Huff | ............... | A47G 33/1206 248/524 |
| 4,714,225 A * | 12/1987 | Skinner | ............... | H01Q 1/1242 248/523 |
| 4,783,662 A * | 11/1988 | Wirth, Jr. | ............... | H01Q 1/125 343/757 |
| 4,799,642 A * | 1/1989 | Wright | ............... | H01Q 1/1242 248/237 |
| 5,233,809 A * | 8/1993 | Gropper | ............... | E04H 12/187 343/882 |
| 5,363,116 A * | 11/1994 | Allen | ............... | H01Q 1/1235 248/170 |
| 5,576,722 A * | 11/1996 | Bustillos | ............... | H01Q 1/125 248/170 |
| 6,229,497 B1 * | 5/2001 | McCracken | ............... | H01Q 1/12 248/188.5 |
| 7,137,608 B2 * | 11/2006 | Willey | ............... | F16M 11/00 248/168 |
| 7,984,884 B1 * | 7/2011 | Iliev | ............... | A47G 33/12 248/146 |
| 8,960,615 B1 * | 2/2015 | Johnson | ............... | F03D 11/04 248/163.1 |
| 2003/0101634 A1 * | 6/2003 | Bhullar | ............... | A01M 1/226 43/1 |
| 2011/0095956 A1 * | 4/2011 | Conrad | ............... | H01Q 1/08 343/840 |
| 2011/0215206 A1 * | 9/2011 | Conrad | ............... | F16M 11/04 248/121 |
| 2011/0304519 A1 * | 12/2011 | Klein | ............... | F16M 11/126 343/890 |
| 2012/0228442 A1 * | 9/2012 | Clifton | ............... | F24J 2/523 248/163.1 |
| 2014/0115978 A1 * | 5/2014 | Fairbairn | ............... | E02D 27/42 52/126.1 |
| 2015/0023009 A1 * | 1/2015 | White | ............... | G09F 21/04 362/183 |
| 2015/0308140 A1 * | 10/2015 | Clifton | ............... | F03D 9/007 248/346.2 |
| 2015/0323124 A1 * | 11/2015 | Erdos | ............... | F16M 13/02 29/428 |
| 2015/0376857 A1 * | 12/2015 | Clifton | ............... | E04H 12/2238 52/292 |

FOREIGN PATENT DOCUMENTS

| | | | | |
|---|---|---|---|---|
| CN | 202064679 | | 12/2011 | |
| DE | 19701229 | | 7/1998 | |
| DE | 202005003425 | | 7/2006 | |
| DE | 102010009140 | | 8/2011 | |
| FR | 2850695 A1 * | | 8/2004 | ........... E04H 12/187 |
| WO | WO 2007108748 A1 * | | 9/2007 | ........... E04H 12/2238 |
| WO | 2010059489 | | 5/2010 | |

OTHER PUBLICATIONS

Chinese Office Action for Chinese Application No. 201380042157.4, Dated Jan. 27, 2016, 5 Pages.

* cited by examiner

DEVICE FOR ANCHORING CONSTRUCTIONS IN THE GROUND

CROSS-REFERENCE TO RELATED APPLICATIONS

This application is the U.S. national phase of PCT Application No. PCT/EP2013/061846 filed on Jun. 7, 2013, which claims priority to DE Patent Application No. 10 2012 212 700.3 filed on Jul. 19, 2012, the disclosures of which are incorporated in their entirety by reference herein.

TECHNICAL FIELD

The invention relates to a device for anchoring constructions in the ground.

BACKGROUND

The invention is employable for anchoring various constructions in the ground. These may be, for example, traffic signs, advertising panels, solar plants, wind turbines, sound protection walls, transmitter pylons, and a plurality of further components.

Components of this type have hitherto generally been anchored in a concrete foundation which is incorporated in a hole in the ground which is excavated for this purpose on site. The works connected therewith are complex and cost intensive.

DE 197 01 299 A1 proposes the use of a concrete duct which is composed of prefabricated parts which are to be assembled at the installation site, as a foundation for the support, in that the support is immovably fastened on the duct prior to the duct with the lower part of the support being inserted into the ground.

To this end, a hole has to be initially excavated in the ground, the support fastened on the duct, the duct inserted into the hole in the ground and aligned such that the support assumes the desired position. The remaining hole in the ground is subsequently filled in and the ground material is compressed such that the duct and thus the support are fixedly anchored in the ground.

The remaining hole in the ground is usually filled with concrete around the duct, in order to anchor the duct even more firmly in the ground, this being required when fastening particularly high supports or pylons or supports which are particularly heavily stressed.

From DE 10 2010 009 140 A1 an anchoring device which contains a main body for fastening constructions is known, wherein the lower region of the ground body at the ground side is connected to a base plate in which plane a planar two-dimensional structure is disposed so as to be concentric with the main body and is fixedly connected to the latter, and the upper region is connectable to a part of the construction.

U.S. Pat. No. 4,799,642 A describes an antenna support for holding an antenna on a surface, for example a roof. The antenna support displays an elongate pylon, a base structure, and bracings between the pylon and the base structure which hold the pylon in a vertical position. The bracings are fastened on the pylon so as to be spaced apart from the central axis of the latter, such that they secure the pylon against rotation about its central axis.

A portable foldable support structure for a microwave dish antenna is known from U.S. Pat. No. 5,363,116 A. Three or more legs, which run in an oblique manner to a base plane and in this base plane are connected to the central column by means of braces, are articulated close to their upper end on a central column.

A base for an offshore wind energy plant is described in DE 20 2005 003 425 U1. The base comprises at least three foundations having in each case at least one foundation junction element. The foundations are to be placed onto a contact plane, are interconnected in pairs by rim tubes, and in each case via a star-connection element connected to a duct-foot junction element which is disposed in the center of the polygon defined by the foundations and below a head junction element. The base furthermore comprises head braces which in each case extend from a foundation junction element to a head junction element which is disposed above the contact plane. The junction elements are formed from concrete. The spoke tubes, the rim tubes, and the head braces are configured as spun concrete tubes which are in each case clamped between stop faces on the foundation junction elements, on the head junction element, and/or on the duct-foot junction element. At least the head braces are clamped in each case by way of at least one clamping element between the foundation junction elements and the head junction element.

SUMMARY

The invention is based on the object of improving the known anchoring devices such that it enables high loading and simultaneously can be shipped and assembled with low complexity.

The object is achieved according to the invention by an assembly which displays the features which are stated the independent claims.

Advantageous design embodiments of the invention are the subject matter of the dependent claims.

In a first embodiment according to the invention the device contains a support column and supporting plates. The support column preferably is composed of a tube, but may also be composed of other profiles, for example a U-profile. The supporting plates form a supporting plane on the lower side of the device. This supporting plane is formed at least by outer supporting plates and is placeable on the bottom of a ground excavation. The support column is preferably a continuous tube which on the upper side of the former protrudes from the ground plane. The outer supporting plates are connected by way of a spatial bar-type supporting frame with the support column. The bar-type supporting frame is formed by connecting webs. Here, the outer supporting plates are interconnected and connected to the support column by way of horizontally disposed webs. By way of further obliquely disposed connecting webs the outer supporting plates are connected to a region of the support column which is located in the plane of the ground or at a short spacing below that plane. In order to fasten the obliquely disposed connecting webs, a fastening element on which the obliquely disposed connecting webs are fastened is located on the support column. It is also possible for each obliquely disposed connecting bar to be fastened on the support column by way of a dedicated fastening element.

The support column, the supporting plates, and the connecting webs are composed of steel, wherein all these components are interconnected by screw connections or rivet connections.

At the upper end of the support column various constructions can be attached. The device can be shipped to the erection site in individual parts and screwed together there. For erection, it is merely necessary for a pit to be excavated into which the assembled device is placed. Thereafter, the pit is filled again using the excavated material and compressed.

In an alternative embodiment according to the invention, in order to anchor constructions in the ground, the device comprises a support element and supporting plates which are disposed in a supporting plane. The support element, the supporting plates, and the connecting webs are composed of steel and are interconnected by screw connections. The supporting plates are connected to the support element by connecting webs, in that horizontal webs in the supporting plane interconnect outer supporting plates, and oblique webs connect the support element to the supporting plates lying in the supporting plane by means of a fastening element which is disposed on the support element.

This embodiment of the device is usable as a foundation for a building, for example. A plurality of devices of this type are placeable onto the bottom of a ground excavation, for example, the latter to be subsequently filled with filler material. The support elements of the devices after filling of the ground excavation are located so as to be level with an upper edge of the landscape, i.e. level with the ground plane. The building to be anchored in the ground, for example a slab of a building, is then to be placed onto these support elements. This makes possible very rapid, simple and cost-effective configuration of the foundation in comparison with conventional foundations which are very complex to cast and thereafter have to harden for a predetermined time, for example a plurality of days, before the construction works can be continued. In this embodiment, the devices, by way of the support elements, have to absorb in particular vertical forces which, through the building lying on the devices, act on the devices and divert said forces to the subsoil by way of the connecting webs and the supporting plates. Here, horizontal forces do not arise or arise only to a slight extent. The devices, in particular the support elements thereof, are stabilized in the horizontal direction by way of the building, for example the slab, which they support. The building, for example the slab, bears on the support elements, such that no lateral moment of tilting or force acts on the support elements, and the support elements and the devices, therefore, have no tendency toward lateral tilting.

This embodiment of the device may also be shipped to the erection site in individual parts and screwed together there. Here too, erection merely necessitates the excavation of a pit into which the assembled device is placed or, in the case of this embodiment, a plurality of devices are placed, respectively. Thereafter, the pit is filled again using the excavated material and compressed.

In the case of both embodiments according to the invention it is particularly advantageous that the excavated ground is re-used, without remnants remaining and without concrete parts having to be introduced into the ground. In this manner, soil sealing and the environmental stress connected therewith are avoided.

In the case of the first embodiment, a central supporting plate expediently is welded to the ground-side end of the tubular support column. On account of this central supporting plate, the positional stabilization of the device is further improved and the device can be even more heavily loaded, without sinking into the ground.

One advantageous embodiment provides that the supporting plates are configured so as to be rectangular. In this manner, both cost-effective production and also good stability are achieved. Moreover, this design is very suitable for shipping the device. Alternatively, other shapes, for example round, oval or polygonal shapes, for example triangular, pentagonal, hexagonal, heptagonal, octagonal or nonagonal shapes, or else shapes having more corners, are also possible. It is also possible here for diversely shaped supporting plates to be used on the device. In this way, supporting plates which are adapted to respective requirements can be used, for example.

In order to increase the strength, it is possible for bracing plates to be welded to the supporting plates. The bracing plates may be used for fastening the connecting webs.

One further advantageous embodiment provides that the device contains four outer supporting plates which are in each case connected by way of connecting webs to the support column, for example by way of the central supporting plate which is disposed on the support column, if said central supporting plate is present. In this manner, high stability against overturning can be achieved with minor complexity, such that vertical and horizontal loads can be absorbed in an optimal manner. In other embodiments the device may also display another number of outer supporting plates, for example merely two or three outer supporting plates, or else five or more outer supporting plates.

The second embodiment of the device according to the invention, which in place of the support column displays the support element, may also display two, three, four, five or more outer supporting plates which then are interconnected in the supporting plane and are connected to the support element by way of oblique webs.

One advantageous embodiment provides that the connecting webs are steel webs having a U-profile. This embodiment results in high strength and also permits simple screwing. A high load potential results on account of the use of particularly wide U-profiles which are open toward the top and into which the ground earth is introduced.

It is furthermore possible that the connecting webs are connected to the support column or the support element, respectively, via swivel joints. In this manner, the device can be shipped in a folded manner and be readily and rapidly transformed into the final state at the erection site. In this way, extensive assembly works on the device are no longer necessary at the erection site. Folding and unfolding takes place in an analogous manner to an umbrella, for example.

One further embodiment provides that coupling elements for the releasable connection to temporary shipping components are disposed on the support column or the support element, respectively. The supporting plates are advantageously to be used as temporary shipping components. On account thereof, the device parts are to be disposed in a space-saving manner for shipping and moreover to be fastened to one another, such that loss of individual parts during shipping is prevented. Furthermore, in this way the device parts are to be disposed in such a manner that the device displays shaping which is favorable for shipping and for any potentially employed shipping packaging, for example a compact rectangular-block shape.

In one advantageous embodiment, appendage parts for fastening above ground are disposed on the outer supporting plates. This embodiment of the device is not for employment in a soil pit, but to be fastened above ground by means of the appendage parts on components, for example on a building roof or on a concrete foundation. In this way, additional potential uses for the device are presented.

In one further advantageous embodiment, the components disposed in the supporting plane are provided with an additional covering. This covering may be configured for example as a plate, for example a profiled plate, or as a so-called geotextile fabric, for example as a so-called non-woven geotextile fabric. Alternatively, other materials are also suitable for covering.

In one further advantageous embodiment, additional anchoring is attached to the outer supporting plates. This additional anchoring may be in each case configured as a soil dowel or drilling foundation, for example. The additional anchoring may be introduced into the ground earth either in a perpendicular or horizontal or oblique manner.

One further advantageous embodiment provides that adjustable supporting feet are disposed on the supporting plates. The supporting feet advantageously are implemented such that they can be actuated from above. In this manner, unevenness of the ground surface can be compensated for, such that a perpendicular alignment of the support column or the support element, respectively, is also possible then when the ground onto which the device is placed is oblique or uneven.

In one further advantageous embodiment, at least one lateral region of at least one of the supporting plates is angled. Advantageously, a plurality of lateral regions are angled, for example both longitudinal lateral regions and/or both transverse lateral regions. Advantageously, a plurality of or all supporting plates have one chamfer of this type or a plurality thereof. The at least one lateral region or the plurality of lateral regions may in each case be angled upward or preferably downward, for example at an angle of approx. 90°. On account of the chamfer or, preferably, the plurality of chamfers, horizontal movement of the respective supporting plate and thus the device is prevented, since the respective supporting plate, and, by way thereof, the device is anchored in the ground earth and thus secured against horizontal movements by means of the chamfer or the plurality of chamfers.

In one further advantageous embodiment, at least one of the supporting plates is pivotably disposed. Advantageously, a plurality of or all supporting plates of the device are pivotably disposed. In this way, adapting the alignment of the supporting plates to a bottom of the ground excavation is enabled, such that a secure erection of the device is enabled.

Usually, the support column in the case of the first embodiment of the device or the support element in the case of the second embodiment of the device, respectively, is centrically disposed, i.e. the outer supporting plates are all identically spaced apart from the support column or the support element, respectively, in order to in this way enable uniform stabilizing in all directions. However, another variant in which the tubular support column in the first embodiment of the device or the support element in the second embodiment of the device, respectively, is eccentrically disposed is also possible. In the case of this variant, one or more outer supporting plates display less spacing in relation to the support column or to the support element, respectively, than one or more further outer supporting plates. Three or more outer supporting plates which in each case are differently spaced apart from the support column or the support element, respectively, may also be provided. On account thereof, adapting the device to respective requirements is enabled, for example to different supporting requirements in various directions, or to a limited construction space.

In this manner, four such devices are to be employed for supporting a high-tension pylon, for example, wherein in each case one device is provided for each of four substantially vertical pylon braces of the high-tension pylon. On account of the shaping of the high-tension pylon, only limited construction space is available here between the four devices which are disposed on a rectangular or square footprint, such that the outer supporting plates of a device which are disposed in the direction of another of the devices and thus on a peripheral region of the rectangular or square footprint of the high-tension pylon display a small spacing in relation to the support column on which they are fastened, and the other outer supporting plates of the respective device which face away from the respective other devices and are disposed outside the rectangular or square footprint of the high-tension pylon display a larger spacing to the respective support column and thus also a comparatively large spacing in relation to the high-tension pylon. In particular by way of these outer supporting plates which are disposed outside the rectangular or square original footprint of the high-tension pylon a very large footprint which is defined by the devices and a large leverage effect of the devices in relation to horizontal loads of the high-tension pylon is achieved on account of the comparatively large spacing thereof in relation to the respective support column, such that the high-tension pylon is very well secured against tilting movements and in this way is also resistant to large horizontal loads.

The device is capable of reliably absorbing both high vertical loads and also high horizontal loads.

The impinging vertical loads are distributed onto the supporting plates by the spatially disposed oblique webs such that a largest possible stability against tilting is achieved. Fixing of the supporting plates toward the support column axis takes place by way of radial webs and, additionally amongst the supporting plates, by way of tangential webs, on account of which a structure which is inherently spatially stable is achieved.

The impinging horizontal loads are guided to the bearing steel plates by way of oblique webs which lie opposite one another in pairs, where they are transmitted to the ground earth by the bracing plates, which are welded onto the supporting plates, the radial webs and the tangential webs.

It is a particular advantage of the device that the oblique webs and the supporting plates are disposed underground, in order to achieve a high resistance to raising forces by exploiting the superimposed load of the earth, on the one hand, and in order not to restrict the clear space around the pylon which protrudes from the ground, on the other hand.

Additionally, the resistance to raising forces is again increased on account of the superimposed load of the earth on the radial webs and the tangential webs.

Simultaneously, the horizontal deformation (of a pylon, for example) under load is significantly decreased in comparison with a pylon footing which is embedded in the ground earth only along the pylon footing.

In comparison with an anchoring of concrete the device has the advantage that the latter displays a significantly lower weight, requires a significantly smaller construction space, can be rapidly installed, has no consequential soil sealing, and is the more cost-effective solution. In contrast thereto, a concrete anchoring has to be cast in a plurality of steps and thereafter has to harden for a plurality of days. On account of the significantly lower weight of the device in comparison with a concrete anchoring, no additional load on the ground arises.

Moreover, on account of the small mass of the device which is significantly smaller than with conventional concrete anchoring, bases, or foundations, improved resistance to earthquakes is achieved. When considering loads due to earthquakes, a low weight is particularly advantageous, since the lighter the device, the lower the forces that said device has to absorb in the event of an earthquake. If large and inertial masses are set in motion, for example a conventional concrete foundation, they increase the force of the quake acting thereon. This is not the case with the described device, on account of its small mass. Moreover, the device displays high stability, even in the event of vibrations of an earthquake, for example, acting thereon, such that even in such a case retention of the equilibrium of the device is ensured even in the event of intense vibrations and the risk of tilting or subsidence is significantly reduced. The device furthermore is robust and flexible and in the event of heavy loads, for example on account of intense shocks or vibrations, in particular in the event of an earthquake, displays an elastic behavior, such that deformations are absorbed without incurring damage. In this way, the device displays the ability to absorb energy and to accommodate in its components deformations which are caused by earthquakes, without incurring comparatively large damage in the course thereof.

On account of disposing the device in an earth pit, also referred to as a ground excavation, and the subsequent filling of the earth pit in that after insertion of the device the previously excavated ground earth is filled in again up to the ground surface and compressed, the device is stabilized against both horizontal and also vertical loads which arise. Vertical loads are diverted by the supporting plates into the subsoil below the device. In the event of horizontal loads arising, which impinge on the support column, the device tends to tilt in the effective direction of the force of the impinging horizontal loading force. This is prevented by the outer supporting plate or the plurality of outer supporting plates disposed so as to be behind the support column in the effective direction of the force, which support the device in relation to the subsoil and divert arising forces downward into the subsoil.

Moreover, this tilting is in particular also prevented by the outer supporting plate or the plurality of outer supporting plates disposed so as to be in front of the support column in the effective direction of the force, which support the device in relation to the ground earth, i.e. to the superimposed load of the ground which is located on these outer supporting plates, and thus divert arising forces upward into that ground earth.

In the course of experiments with horizontal loads acting on the device it has been demonstrated that a significant amount of ground earth is mobilized when the device tilts. A break-out mound which extends on the bottom of the earth pit, which has been excavated for inserting the device and has subsequently been filled in again, across the entire area of the earth pit and increasingly widens toward the top is formed in the course thereof. Here, on account of the framework-type configuration of the device, the ground earth in the entire region of the device and thus in the entire region of the earth pit which has been excavated for inserting the device and has subsequently been filled in again is completely mobilized, i.e. across an entire footprint which is covered by the device and not only in the region of the supporting plates. On account of the ground material a very large superimposed load which stabilizes the device and prevents it from tilting results therefrom, such that the device withstands very large loads, in particular also very large horizontal loads.

Bedding the device in ground earth and not in concrete moreover has the advantage that no ageing effects arise. A concrete anchoring ages and may break up. In contrast, the ground earth stabilizes the device over a very long time. Should even only slightest movements or vibrations of the device occur, the ground earth on account thereof slides in to fill the space and is compressed, such that the device stabilizes itself and permanently in the ground earth. The ground earth in particular also absorbs cyclical loads and oscillations significantly better than concrete, for example, in which on account of such loads a high risk of damage exists. In this manner, the device is also suitable for wind-energy plants, for example, in which such vibrations may occur. Since the device is anchored in the ground earth by means of the supporting plates in a stable manner in the way described, even large loads may act on the device without negative consequences.

This stabilization of the device by means of the ground earth may be further improved by covering the components which are disposed in the supporting plane, such that the device can withstand even larger loads. The covering is configured, for example, as a profiled plate, a non-woven geotextile fabric, or another material.

Since no soil sealing takes place on account of the device, plant growth may develop above the device, the root system of which functions as additional armor, on account of which the device is anchored in the ground in an even more stable manner. Furthermore, the device may be exactly adapted to respective requirements by means of the number and the arrangement of the outer supporting plates. For example, the number and the alignment of the outer supporting plates are conceived such that the device displays the required stability under load exactly in the required direction and not in all directions, as is the case in a concrete mounting. That is to say that in the case of the device only those loads which actually arise are considered. On account thereof, a reduction in material, weight and costs can be achieved.

Exemplary embodiments of the invention are explained in more detail in the following by means of drawings.

BRIEF DESCRIPTION OF THE DRAWINGS

In the drawings.

Mutually corresponding parts are provided with the same reference sign in all figures.

DETAILED DESCRIPTION

Figures 1A, 1B:
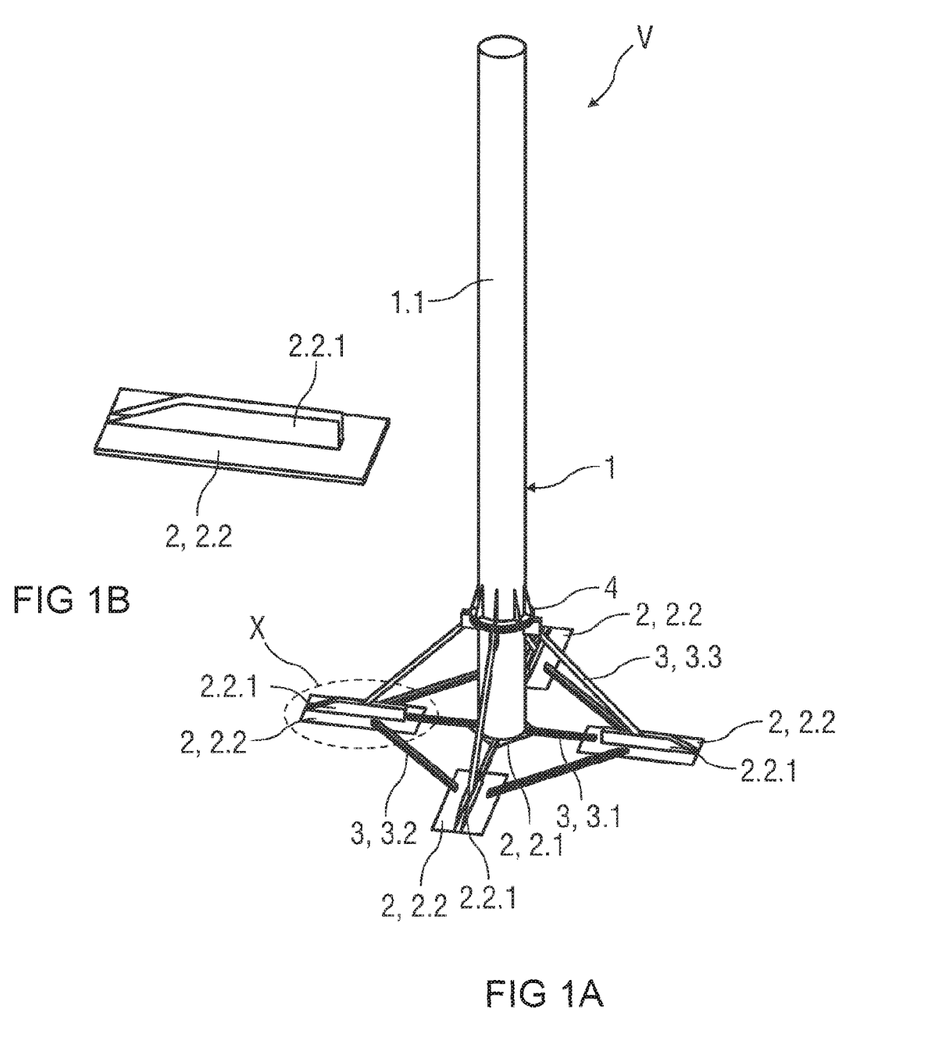
FIG. 1 shows a perspective view of the device.

FIG. 1, in a perspective view, shows an embodiment of a device V for anchoring constructions in the ground, in an assembled state. The device V contains a tubular support column 1 and supporting plates 2, here comprising a central supporting plate 2.1 and outer supporting plates 2.2. The support column 1, on its upper side, protrudes from the ground plane and, on the lower side, reaches up to the central supporting plate 2.1. In further embodiments (not illustrated in more detail here), this central supporting plate 2.1 is not mandatory. The device V illustrated here displays a central supporting plate 2.1 and, in the illustrated embodiment, four outer supporting plates 2.2. The supporting plates 2 are fastened on connecting webs 3, comprising radial webs 3.1, tangential webs 3.2, and oblique webs 3.3. The central supporting plate 2.1 and the outer supporting plates 2.2 on the lower side of the device V form a supporting plane, which is placed on the bottom of an earth excavation. The outer supporting plates 2.2 are interconnected by tangential webs 3.2 and connected to the central supporting plate 2.1 by radial webs 3.1. In the event of the device V not displaying any central supporting plate 2.1, the outer supporting plates 2.2 are connected to the tubular support column 1 by the radial webs 3.1. By way of oblique webs 3.3 the outer supporting plates 2.2 are connected to the region of the support column 1, which after insertion of the device V is located in the ground of the plane or just a short distance below that plane. The supporting plates 2, i.e. the central supporting plate 2.1 and/or the outer supporting plates 2.2, may display a fixed alignment or be pivotable, such that adjustment of the respective supporting plate 2 at a predetermined angle depending on requirements is enabled. In order to fasten the oblique webs 3.3 on the support column 1, a fastening element 4 is attached to the latter. The fastening element 4 in the illustrated embodiment is composed of a ring which is welded to the support column 1 and which displays bores onto which the upper ends of the oblique webs 3.3 are screwed.

In the detail X an embodiment in which a bracing plate 2.2.1 is attached to an outer supporting plate 2.2 is shown. The bracing plates 2.2.1 may be used for fastening the connecting webs 3. Moreover, the outer supporting plates 2.2 are stabilized on account of bracing plates 2.2.1 of this type.

Figures 2A, 2B:
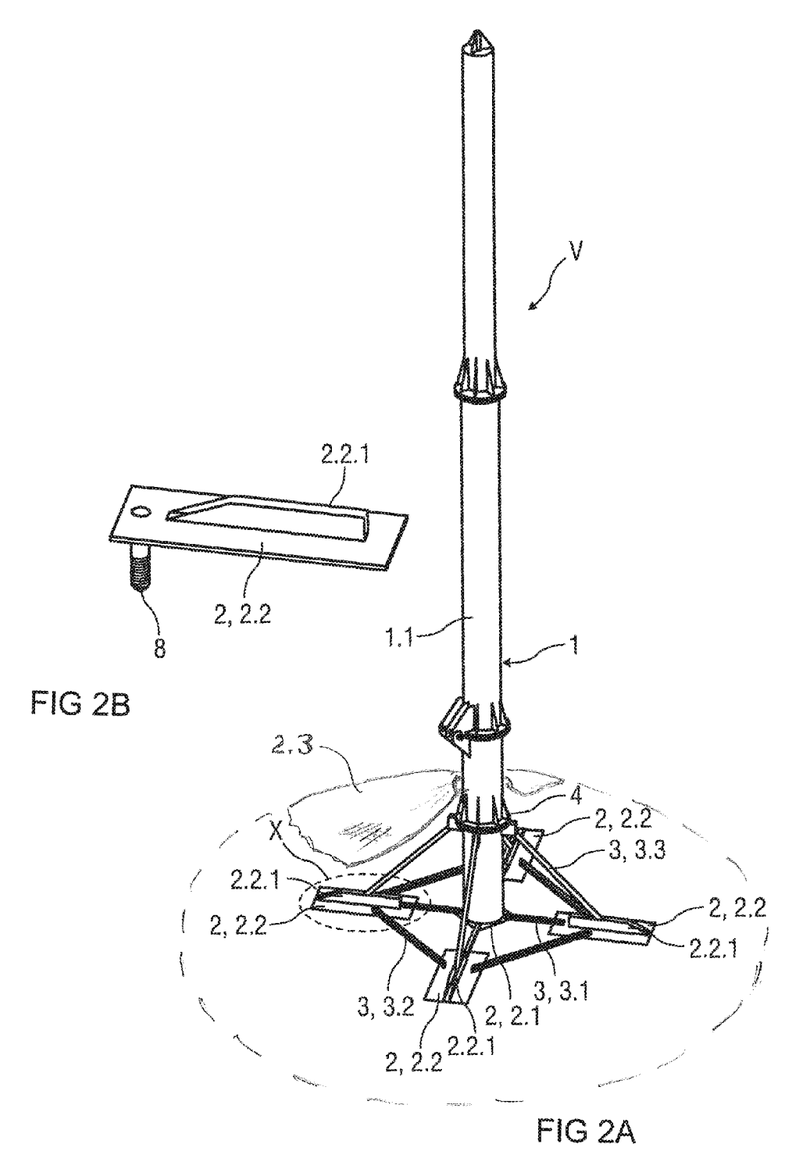
FIG. 2 shows a perspective view of the device having a split support column.

In the embodiment illustrated in FIG. 2 a tubular extension 1.1 is attached to the support column 1 which is connected by means of a pivotable connection to the support column 1. Therewith, embodiments which are envisaged for constructions disposed in an elevated manner can be erected more easily. In the detail X of this FIG. 2 a possibility in which additional anchoring is attached to the outer supporting plates 2.2 is shown. Soil dowels or drilling foundations may be anchoring means 8, for example. The anchoring may be introduced both vertically and also horizontally into the ground earth. Also illustrated in the FIG. 2 embodiment is provided with an additional covering which may be configured for example as a plate, for example a profiled plate, or as a so-called geotextile fabric. In FIG. 2, embodiment the additional covering is a non-woven geotextile fabric 2.3 shown schematically in partial cut away view.

Figure 3:
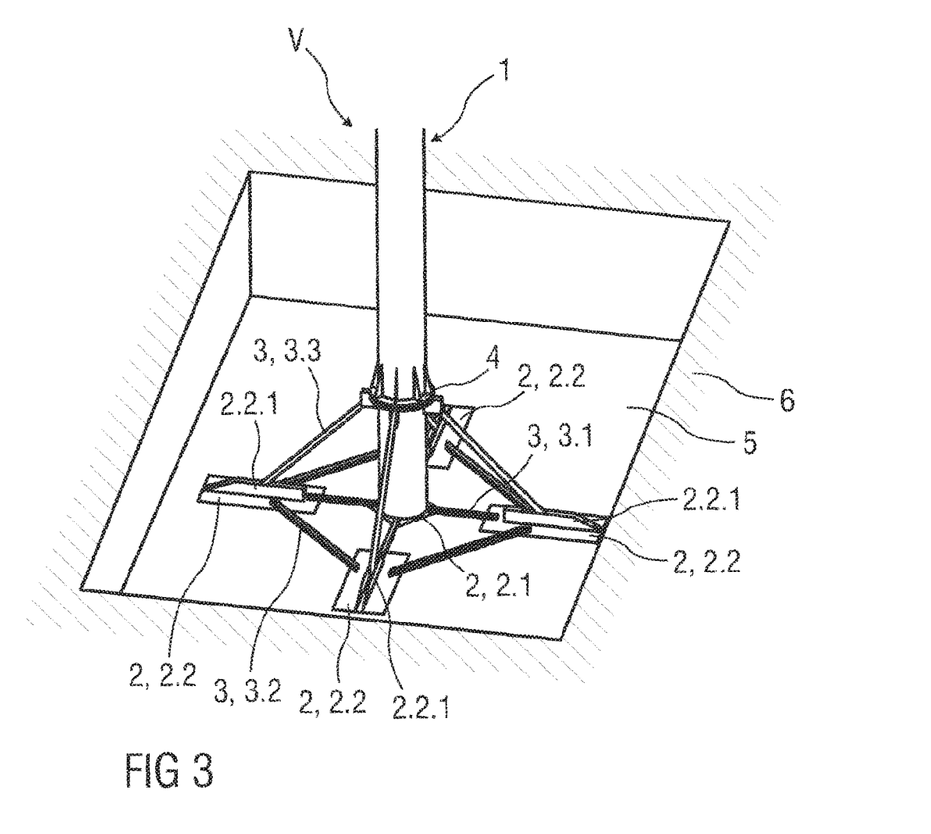
FIG. 3 shows the arrangement of the device in an earth pit.

FIG. 3 explains the arrangement of the device V in an earth pit 5, also referred to as an earth excavation. In the drawing, the state prior to filling the earth pit 5 is illustrated. After inserting the device V, the previously excavated ground earth is filled in again up to the ground surface 6 and compressed. In this way, the device V is stabilized in relation to both horizontal and vertical loads which arise. Vertical loads are diverted by the supporting plates 2 into the subsoil below the device V. In the event of arising horizontal loads which impinge on the support column 1, the device V tends to tilt in the effective direction of the force of the impinging horizontal load. This is prevented by the outer supporting plate 2.2 or the plurality of outer supporting plates 2.2 disposed so as to be behind the support column 1 in the effective direction of the force, which support the device V in relation to the subsoil and divert arising forces downward into the subsoil. Moreover, this tilting is also prevented by the outer supporting plate 2.2 or the plurality of outer supporting plates 2.2 disposed so as to be in front of the support column 1 in the effective direction of the force, which support the device V in relation to the ground earth which is located on these outer supporting plates 2.2, i.e. in relation to the superimposed load of the earth, and thus divert arising forces upward into this ground earth. Since the device V is anchored in a stable manner in the ground earth in the way described by means of the supporting plates 2, even large loads can act on the device V without negative consequences.

Figure 4:
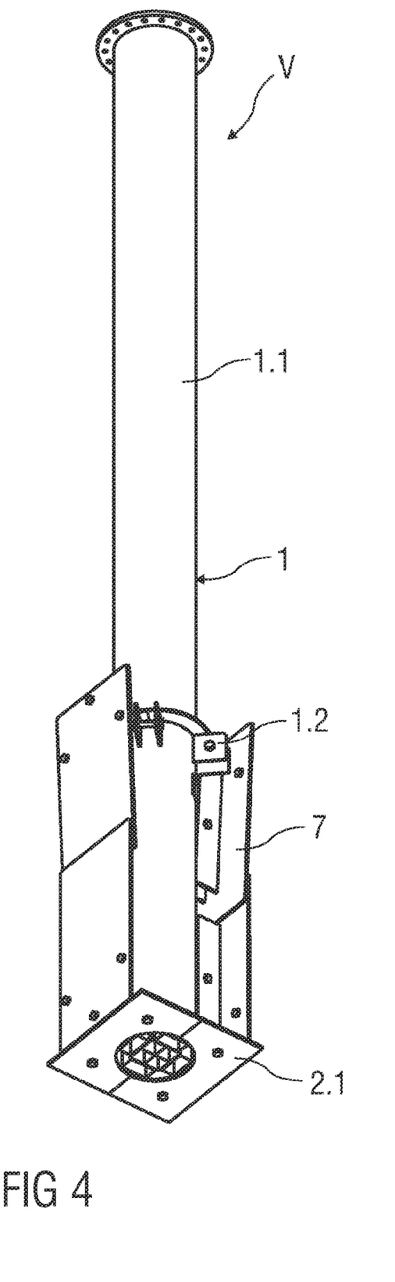
FIG. 4 shows the device in the shipping position.

FIG. 4 shows the device V in the shipping position. Coupling elements 1.2, which enable a releasable connection of temporary shipping components 7 to the support column 1, are attached to the support column 1. In the illustrated example tabs which may engage in the threads of temporary shipping components 7 are attached to the support column 1. The supporting plates 2, at least the outer supporting plates 2.2, are advantageously used as temporary shipping components 7. In this manner a space-saving grouping of the components of the device V in which, moreover, the device V can be packed in a rectangular-block shape which is particularly suitable for shipping purposes results.

In a further embodiment which is not illustrated here the device V may also be configured so as to be foldable, in an analogous manner to an umbrella, for example. To this end, the connecting webs 3 are connected to the tubular support column 1 via swivel joints, for example, such that the connecting webs 3 and the outer supporting plates 2.2 can be folded up against the support column 1. To this end, the connection of the connecting webs 3 to the supporting plates 2 expediently is also configured by means of such swivel joints. In this way, the device V is to be folded for shipping and, on account thereof, to be shipped in a space-saving manner. At the respective erection site, the device V then simply has to be unfolded and erected. Extensive assembly works on the device V are no longer required at the erection site in this way.

Figures 5A, 5B:
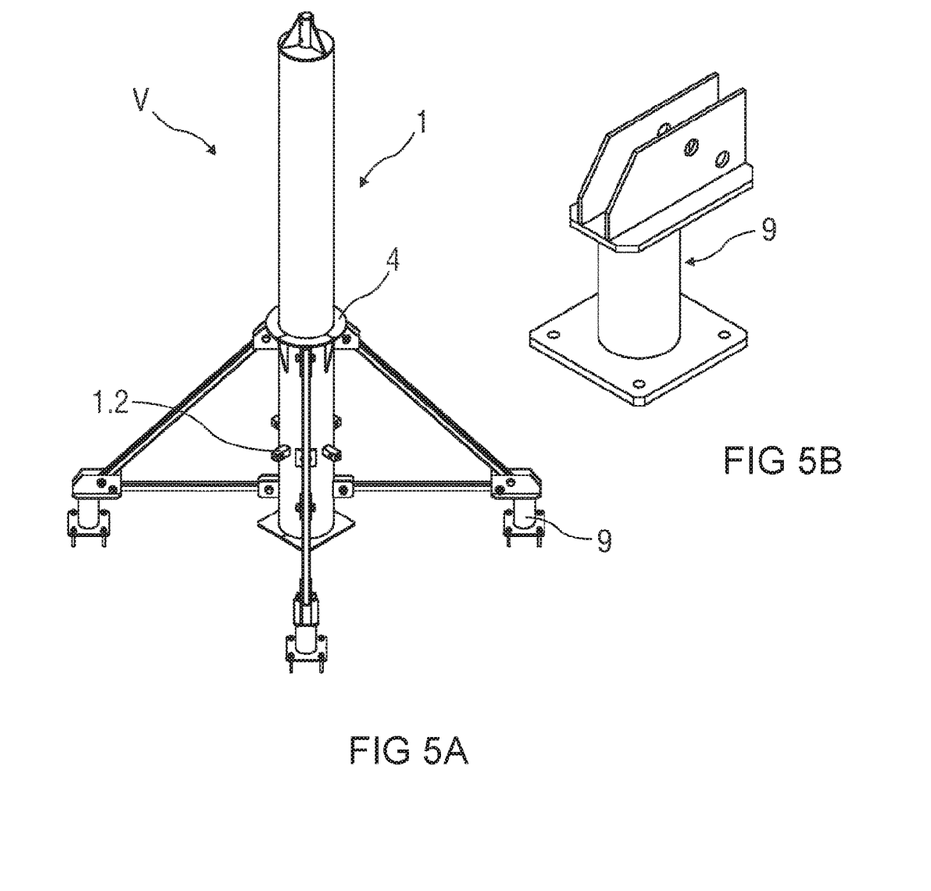
FIG. 5 shows an embodiment for use above ground.

In FIG. 5 an embodiment which is not inserted into an earth pit but can be attached above ground to components, for example to a building roof, is illustrated. To this end, appendage parts 9 by way of which the device V can be fastened are disposed on the outer supporting plates 2.2. This embodiment of the device V may be disposed also on a concrete foundation, for example, and may be fastened thereon by means of the appendage parts 9.

Figure 6:
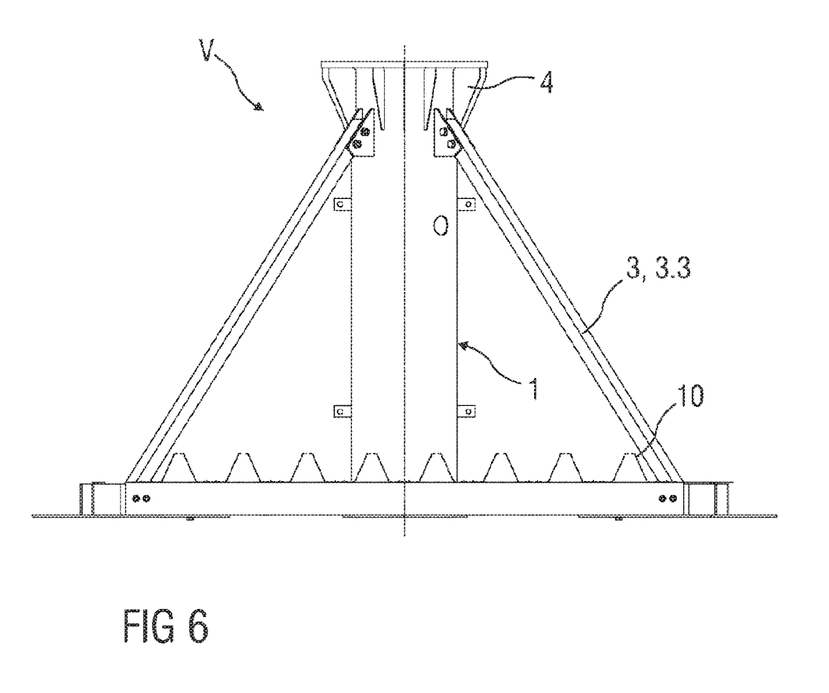
FIG. 6 shows an embodiment with additional covering of the supporting plane.

FIG. 6 shows an embodiment in which the components disposed in the supporting plane are provided with an additional covering 10. In the illustrated example a covering having a profiled plate has been used. Of course, other materials are also suitable for covering, for example a non-woven geotextile fabric. On account of this additional covering 10, further improved anchoring of the device V in the ground earth can be achieved, for example, on account of which arising forces in the event of horizontal loads on the device V can be diverted from the respective outer supporting plates 2.2 via the additional covering 10 to a larger region of the ground earth above the device V. On account thereof, the device V is additionally stabilized.

Alternatively or additionally to the covering 10, the supporting plates 2 may also be cast in concrete, such that a compact concrete plate which is covered with ground earth is configured in the earth pit 5. This has a similar effect to the covering 10, since the ground earth on the concrete plate acts as a strong and compact superimposed load and prevents tilting of the device V even in the case of very large horizontal loads.

Figure 7:
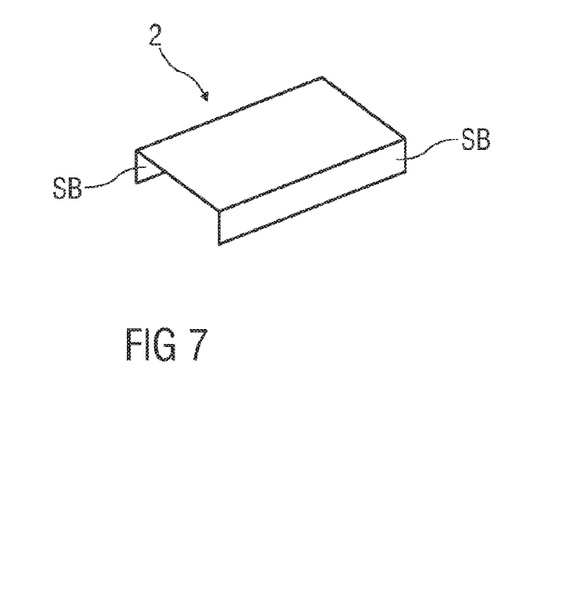
FIG. 7 shows an embodiment of a supporting plate.

FIG. 7 shows a further advantageous embodiment of a supporting plate 2 of the device V. This supporting plate 2 may be an inner supporting plate 2.1 or an outer supporting plate 2.2 of the device V. The supporting plate 2 displays angled lateral regions SB. In the exemplary embodiment illustrated here, longitudinal lateral regions of the supporting plate 2 are angled downward. In other exemplary embodiments, transverse lateral regions may also alternatively or additionally be angled. One or a plurality of lateral regions SB may be angled, in each case downward or upward, advantageously at an angle of approx. 90°. In this way, horizontal anchoring of the device V in the ground is achieved, such that movement of the device V in the horizontal direction is prevented by the angled lateral regions SB of the supporting plates 2. On the device V here, all or a plurality of supporting plates 2 may display the same angled lateral regions SB or in each case different angled lateral regions SB. The device V may also display one or a plurality of supporting plates 2 having in each case at least one angled lateral region SB and one or a plurality of further supporting plates 2 without angled lateral regions SB.

Figure 8:
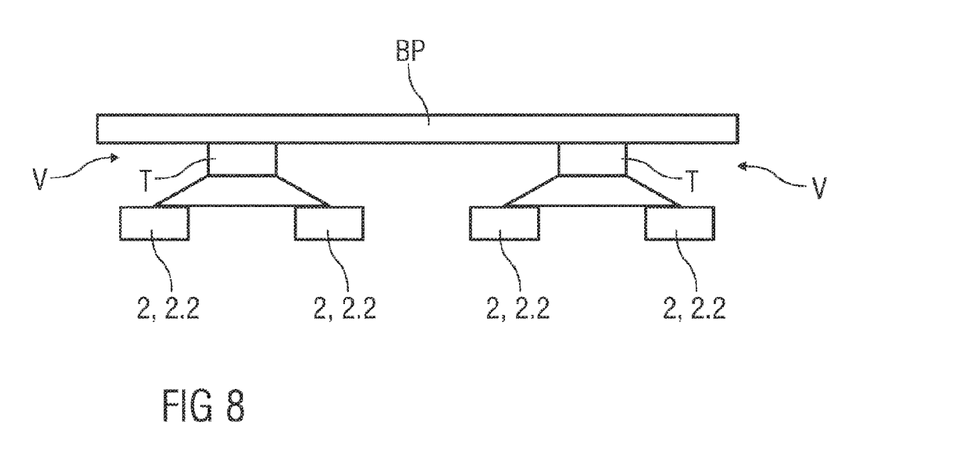
FIG. 8 shows a slab which is supported by a plurality of the devices.

FIG. 8 shows a use of a further embodiment of the device V. The difference in comparison with the previously described embodiments is in that this embodiment displays no support column 1 but a support element T. This embodiment of the device V for anchoring constructions in the ground thus comprises the support element T and the supporting plates 2 which are disposed in the supporting plane, wherein the devices V illustrated here merely display outer supporting plates 2.2. The support element T, the supporting plates 2, and the connecting webs 3 also here are composed of steel and are interconnected by screw connections. The supporting plates 2 are connected to the support element T by connecting webs 3, in that horizontally aligned connecting webs 3, namely radial webs 3.1 and tangential webs 3.2, interconnect outer supporting plates 2.2 in the supporting plane, and oblique webs 3.3 connect the support element T to the outer supporting plates 2.2 lying in the supporting plane by means of a fastening element 4 which is disposed on the support element T. The fastening element 4 may also be deleted, such that the oblique webs 3.3 are directly disposed on the support element T. Alternatively to the embodiment illustrated here, this support element T may also extend down to the supporting plane, in an analogous manner to the support column 1. In this case, this embodiment of the device V may also display a central supporting plate 2.1. The latter is then expediently disposed on a lower side of the support element T. This embodiment of the device V may also display the further features described in the preceding figures.

This embodiment of the device V is usable as a foundation for a building, for example, as is illustrated here. For example, as is illustrated here, a plurality of devices V of this type are placeable onto the bottom of a ground excavation which is subsequently to be filled with filler material. The support elements T of the devices V after filling of the ground excavation are situated level with an upper edge of the landscape, i.e. level with the ground plane. The building to be anchored in the ground, for example a slab BP of a structure, is then to be placed onto these support elements T, as is illustrated here. This enables very rapid, simple and cost-effective configuration of the foundation in comparison with conventional foundations which are very complex to cast and then have to harden for a predetermined time, for example a plurality of days, before the construction works can be continued.

This embodiment of the device V may also be shipped in individual parts to the erection site and be screwed together there. For erecting, it is also merely necessary here for a pit into which the assembled device V is placed or in this embodiment a plurality of devices V are placed, respectively, to be excavated. Thereafter, the pit is filled again, using the excavated material, and compressed.

LIST OF REFERENCE SIGNS

1 Support column
1.1 Tubular extension
1.2 Coupling element
2 Supporting plate
2.1 Central supporting plate
2.2 Outer supporting plate
2.3 Geotextile fabric additional covering
2.2.1 Bracing plate
3 Connecting web
3.1 Radial web
3.2 Tangential web
3.3 Oblique web
4 Fastening element
5 Earth pit
6 Ground surface
7 Temporary shipping component
8 Anchoring means
9 Appendage parts
10 Additional covering
BP Slab
SB Lateral region
T Support element
V Device
X Detail of the outer supporting plate

The invention claimed is:

1. A device for anchoring constructions in the ground, the device comprising:
   a tubular support column,
   supporting plates which are disposed in a horizontal supporting plane,
   a plurality of connecting webs connecting the tubular support column to the supporting plates, wherein
   the tubular support column is configured as a continuous part which extends from the supporting plane to above the ground,
   the tubular support column, the supporting plates, and the connecting webs are composed of steel,
   the tubular support column, the supporting plates, and the connecting webs are interconnected by screw connections,
   wherein the connecting webs further comprise:
   a plurality of horizontal webs in the supporting plane interconnecting outer supporting plates and connecting the outer supporting plates to the tubular support column, and
   a plurality of oblique webs connecting the tubular support column to the supporting plates lying in the supporting plane by means of a fastening element which is disposed on the tubular support column, and
   an additional covering comprising a profiled plate or a geotextile fabric overlying the supporting plates and a plurality of the connecting webs disposed in the supporting plane.

2. The device as claimed in claim 1, further comprising a central supporting plate welded to the ground-side end of the tubular support column.

3. The device as claimed in claim 1, wherein the supporting plates are configured so as to be rectangular.

4. The device as claimed in claim 3, further comprising bracing plates welded to the supporting plates.

5. The device as claimed in claim 1, wherein the connecting webs display a U-profile.

6. The device as claimed in claim 1, wherein the device contains four supporting plates.

7. The device as claimed in claim 1, wherein the horizontal radial webs are connected to the tubular support column via swivel joints.

8. The device as claimed in claim 1, further comprising coupling elements for the releasable connection to temporary shipping components are disposed on the tubular support column.

9. The device as claimed in claim 1, wherein the additional covering comprises a non-woven geotextile fabric.

10. The device as claimed in claim 1, further comprising an additional anchoring attached to the supporting plates.

11. The device as claimed in claim 1, further comprising adjustable supporting feet attached to the supporting plates for compensating unevenness of the ground surface are disposed on the supporting plates.

12. The device as claimed in claim 1, wherein at least one lateral region of at least one of the supporting plates is angled.

13. The device as claimed in claim 1, wherein at least one of the supporting plates is pivotably disposable relative to the tubular support column.

14. The device as claimed in claim 1, wherein the tubular support column is eccentrically disposed.

15. A device for anchoring constructions in the ground, the device comprising:
   a tubular support element, a plurality of supporting plates which are disposed in a supporting plane,
   a plurality of connecting webs connecting the tubular support column to the supporting plates, wherein
   the support element, the supporting plates, and the connecting webs are composed of steel,
   the support element, the supporting plates, and the connecting webs are interconnected by screw connections,
   wherein the connecting webs, comprise:
   a plurality of horizontal radial webs in the supporting plane interconnecting the supporting plates and the tubular support column,
   a plurality of horizontal tangential webs in the supporting plane interconnect the supporting plates, and
   a plurality of oblique webs connecting the support element to the supporting plates lying in the supporting plane by means of a fastening element which is disposed on the support element, and
   an additional covering comprising a profiled plate or a geotextile fabric overlying the supporting plates and a plurality of the connecting webs disposed in the supporting plane.

* * * * *